(12) United States Patent
Nakamura et al.

(10) Patent No.: US 10,773,752 B2
(45) Date of Patent: Sep. 15, 2020

(54) VEHICLE-BODY STRUCTURE

(71) Applicant: MAZDA MOTOR CORPORATION, Hiroshima (JP)

(72) Inventors: Satoshi Nakamura, Hiroshima (JP); Hiroto Kido, Aki-gun (JP); Yasushi Ishikawa, Hiroshima (JP); Atsushi Kawamoto, Hiroshima (JP); Daisuke Kanamaru, Hatsukaichi (JP); Yuuki Uchiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 87 days.

(21) Appl. No.: 16/103,756

(22) Filed: Aug. 14, 2018

(65) Prior Publication Data

US 2019/0061825 A1 Feb. 28, 2019

(30) Foreign Application Priority Data

Aug. 23, 2017 (JP) .................. 2017-159890

(51) Int. Cl.
*B62D 21/15* (2006.01)
*B62D 25/08* (2006.01)

(52) U.S. Cl.
CPC ......... *B62D 21/155* (2013.01); *B62D 21/152* (2013.01); *B62D 25/082* (2013.01); *B62D 25/085* (2013.01)

(58) Field of Classification Search
CPC .. B62D 21/155; B62D 21/152; B62D 25/082; B62D 25/085
See application file for complete search history.

(56) References Cited

U.S. PATENT DOCUMENTS

2015/0274208 A1* 10/2015 Segawa ................ B62D 21/152
180/232

FOREIGN PATENT DOCUMENTS

JP 2016-113084 A 6/2016

* cited by examiner

*Primary Examiner* — D Glenn Dayoan
*Assistant Examiner* — Melissa Ann Bonifazi
(74) *Attorney, Agent, or Firm* — Studebaker & Brackett PC

(57) ABSTRACT

A reinforcing member is provided inside a closed cross section of a front side frame at a position, in a vehicle longitudinal direction, which corresponds to a forming position of a bead. The reinforcing member extends between an outward side wall portion and an inward side wall portion of the front side frame. The reinforcing member is joined to the outward side wall portion and the inward side wall portion of the front side frame. A joint length, in the vehicle longitudinal direction, of the reinforcing member and the inward side wall portion is set to be longer than that of the reinforcing member and the outward side wall portion.

3 Claims, 9 Drawing Sheets

Outward ⟵⟶ Inward

Outward ←→ Inward

VEHICLE-BODY STRUCTURE

BACKGROUND OF THE INVENTION

The present invention relates to a vehicle-body structure which comprises a front side frame extending in a vehicle longitudinal direction at a front part of a vehicle and having a closed cross section.

Conventionally, it is known that the front side frame is actively bent and impact energy is absorbed through bending deformation of this front side frame in a vehicle frontal collision (see Japanese Patent Laid-Open publication No. 2016-113084, for example).

The above-described patent document discloses a front side frame which includes a first region (where a bead is formed at an outward side wall portion, in a vehicle width direction, of the front side frame) which constitutes a compression-side wall portion and a tension-side wall portion through its outward-bending deformation when a load is inputted from a vehicle forward side and a second region (where a bead is formed at an inward side wall portion, in the vehicle width direction, of the front side frame) which constitutes a tension-side wall portion and a compression-side wall portion through its inward-bending deformation when the load is inputted from the vehicle forward side. Herein, there are provided a first reinforcing member which forms plural sub closed cross sections adjacent to each other in a vertical direction in cooperation with a main closed cross section of the above-described first region, a second reinforcing member which forms plural sub closed cross sections adjacent to each other in the vertical direction in cooperation with a main closed cross section of the above-described second region, and an engine mount member which is provided to partition across the above-described main closed cross section. Each of the above-described first and second reinforcing members comprises a first partitioning wall portion which partitions the above-described main closed cross section vertically and a second partitioning wall portion which is configured such that its vertical distance from the first partitioning wall portion on the tension side is smaller than its vertical distance from the first partitioning wall portion on the compression side. The above-described first and second reinforcing members are arranged adjacently, interposing a mount reinforcement therebetween. Thereby, a truss configuration is formed by contacting of respective compression-side end portions of the first and second tension-side partitioning portions which are supported at the tension-side wall portions of the first and second partitioning wall portions, so that sectional collapse which is caused by bending deformation is so suppressed that the absorbing efficiency of the impact energy can be increased.

However, in a case where a reinforcing member like the first and second reinforcing members of the above-described patent document is arranged inside the closed cross section of the front side frame, this reinforcing member is rectangular wavelike such that it protrudes alternately toward the tension-side wall portion and the compression-side wall portion and respective protrusion tip faces of its protrusion portions are joined to the tension-side wall portion and the compression-side wall portion by welding. Consequently, since many welding points are required at both of the tension-side wall portion and the compression-side wall portion, there is room for improvement in terms of the productivity of the front side frame.

SUMMARY OF THE INVENTION

The present invention has been devised in view of the above-described matter, and an object of the present invention is to improve the performance of the impact-energy absorption by the front side frame in the vehicle frontal collision, properly suppressing deterioration of the productivity of the front side frame, in the case where the reinforcing member is arranged inside the closed cross section of the front side frame which is configured to be bent in the vehicle frontal collision.

The present invention is a vehicle-body structure which comprises a front side frame extending in a vehicle longitudinal direction at a front part of a vehicle and comprising an outward side wall portion and an inward side wall portion, the outward side wall portion being positioned on an outward side, in a vehicle width direction, of the vehicle and the inward side wall portion being positioned on an inward side, in the vehicle width direction, of the vehicle, the front side frame having a closed cross section, a bead formed at a middle position, in the vehicle longitudinal direction, of the outward side wall portion of the front side frame, the bead being configured to cause the front side frame to be bent inward at the middle position of the outward side wall portion where the bead is provided in a vehicle frontal collision, and a reinforcing member provided inside the closed cross section of the front side frame at a position, in the vehicle longitudinal direction, which corresponds to a forming position of the bead, the reinforcing member extending between the outward side wall portion and the inward side wall portion of the front side frame, wherein the reinforcing member is joined to the outward side wall portion and the inward side wall portion of the front side frame, and a joint length, in the vehicle longitudinal direction, of the reinforcing member and the inward side wall portion is set to be longer than that of the reinforcing member and the outward side wall portion.

According to the present invention, since the joint length, in the vehicle longitudinal direction, of the reinforcing member and the outward side wall portion is set to be relatively short, the number of welding points of the reinforcing member welded to the outward side wall portion of the front side frame can be reduced, so that the deterioration of the productivity can be suppressed properly. Further, by setting the joint length, in the vehicle longitudinal direction, of the reinforcing member and the outward side wall portion to be relatively short, the outward side wall portion of the front side frame is easily bent inward locally at the position where the bead is provided in the vehicle frontal collision (the outward side wall portion has easily buckling locally at the position where the bead is provided). Meanwhile, since the joint length, in the vehicle longitudinal direction, of the reinforcing member and the inward side wall portion where a tensional load is generated by this bending of the outward side wall portion is set to be relatively long, this tensional load can be received at a wide range in the vehicle longitudinal direction, so that the inward side wall portion is suppressed from being bent locally unlike the outward side wall portion. Accordingly, the performance of the impact-energy absorption by means of the front side frame in the vehicle frontal collision can be improved.

In an embodiment of the present invention, the above-described reinforcing member is made of a plate member which extends in a vertical direction and in the vehicle longitudinal direction, an upper end portion and a lower end portion of the reinforcing member are joined to the outward side wall portion of the front side frame, a middle portion, in the vertical direction, of the reinforcing member is formed as a wavelike portion which is configured to be bent in a rectangular-wavelike shape having plural bending lines extending in the vehicle longitudinal direction, and a protrusion tip face of a part of the wavelike portion which is configured to protrude toward the inward side wall portion of the front side frame is joined to the inward side wall portion.

According to this embodiment, the performance of the impact-energy absorption by means of the front side frame can be further improved by effectively suppressing the local bending of the inward side wall portion.

In another embodiment of the present invention, each of the upper end portion and the lower end portion of the reinforcing member joined to the outward side wall portion of the front side frame is configured to branch off in the vehicle longitudinal direction, interposing the bead therebetween, and be joined to the outward side wall portion.

According to this embodiment, the reinforcing member does not block the smooth local bending of the outward side wall portion, so that the outward side wall portion of the front side frame can be properly bent at the position where the bead is provided by a relatively small load in the vehicle frontal collision (the buckling load can be made properly small).

Other features, aspects, and advantages of the present invention will become apparent from the following description which refers to the accompanying drawings.

DETAILED DESCRIPTION OF THE INVENTION

Figure 1:
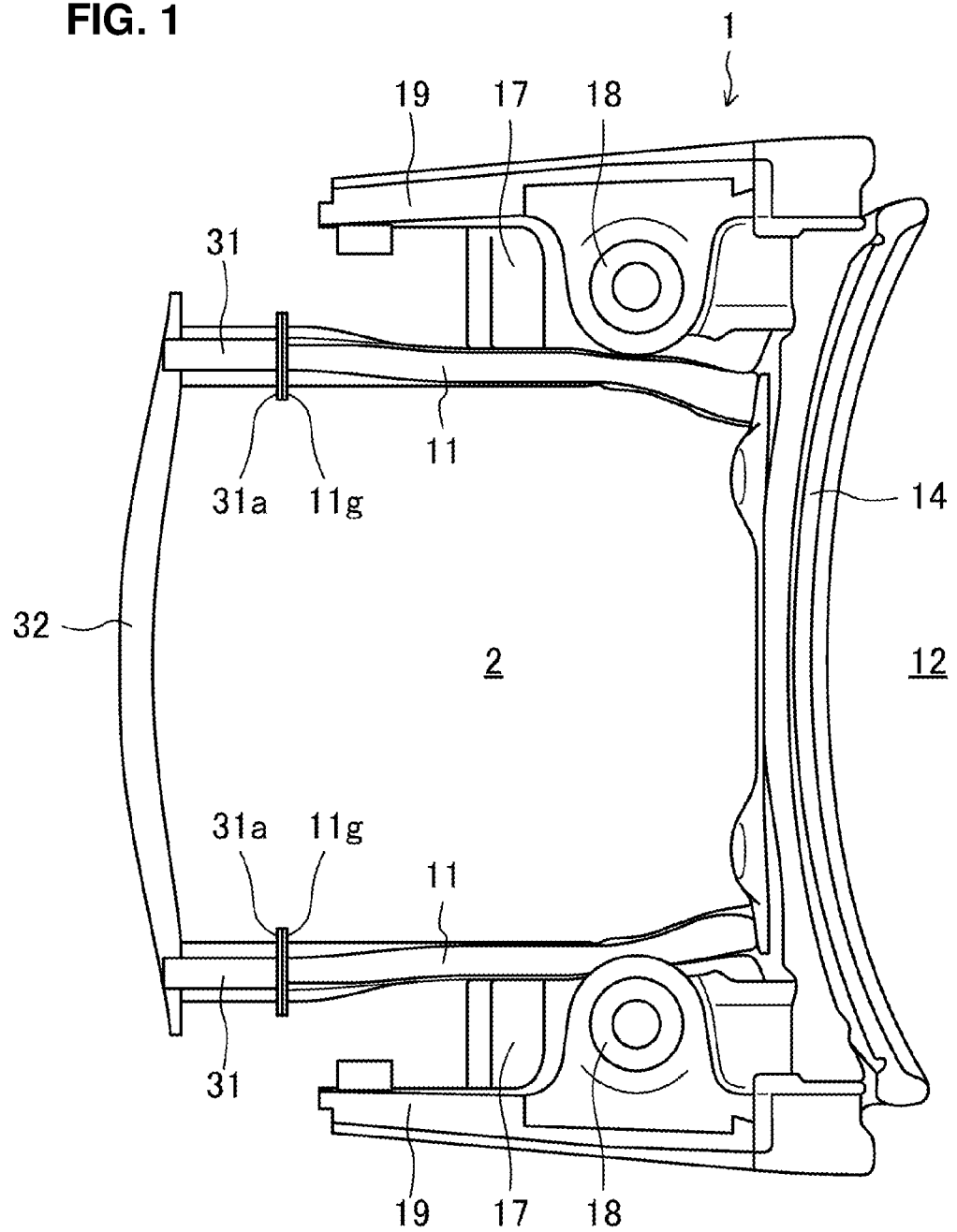
FIG. 1 is a plan view showing a major portion of a front part of a vehicle to which a vehicle-body structure according to an embodiment of the present invention is applied.

Hereafter, an embodiment of the present invention will be described specifically referring to the drawings.

FIG. 1 shows a major portion of a front part of a vehicle 1 to which a vehicle-body structure according to the embodiment of the present invention is applied. An engine room 2 where a powertrain, not illustrated, which drives right and left front wheels (not illustrated) of the vehicle 1 is arranged is provided at the front part of the vehicle 1. The powertrain comprises an engine and a transmission to which a torque (power) generated by the engine is inputted. The engine and the transmission are aligned, in a vehicle width direction, between a pair of right-and-left front side frames 11 which will be described later. Hereafter, the directional terms of "forward," "rearward," "leftward," "rightward," "upward," and "downward" with respect to the vehicle 1 are referred to as "forward," "rearward," "leftward," "rightward," "upward," and "downward" simply.

The right-and-left front side frames 11 which have a roughly rectangular-shaped closed cross section extending in a longitudinal direction are arranged at both-side end portions, in the vehicle width direction, of the engine room 2. A dash panel which partitions the engine room 2 from a cabin 12 is provided at a rear end portion of the engine room 2. A cowl member 14 is joined to an upper end portion of the dash panel. Respective rear end portions of right-and-left apron reinforcement members 19 which extend in the longitudinal direction are connected to both-side ends, in the vehicle width direction, of the cowl member 14. The dash panel is positioned below the cowl member 14, which does not appear in FIG. 1.

A wheelhouse panel 17 and a suspension tower 18 are provided on the outward side, in the vehicle width direction, of each of the right-and-left front side frames 11. The wheelhouse panel 17 is configured in an arc shape such that it covers over the front wheel, and a front wheelhouse is formed in this arc shape. Respective lower end portions of the right-and-left suspension towers 18 are fixed to the right-and-left front side frames 11, and respective upper end portions of the right-and-left suspension towers 18 are fixed to the right-and-left apron reinforcement members 19.

A crash can 31 is provided at a front end face (constituted by a flange portion 11g) of each of the right-and-left front side frames 11, and respective front end faces of the right-and-left crash cans 31 are fixed to right-and-left both end portions of a bumper beam 32 which extends in the vehicle width direction. The crash can 31 is fixed to the flange portion 11g of the front side frame 11 via a flange portion 31a which is provided at a rear end of the crash can 31. The right-and-left front side frames 11 extend obliquely rearward and downward from the same longitudinal position as the dash panel 13.

Since the vehicle-body structure according to the present embodiment is configured to be laterally symmetrical (symmetrical to a plane passing through a center, in the vehicle width direction, of the vehicle 1), the right-side part of the vehicle 1 (the right-side front side frame 11) will be basically described referring to the drawings. Hereafter, the right-side front side frame 11 will be referred to as the front side frame 11 simply. Further, the descriptions of "forward" and "inward" in FIGS. 2-8 mean an outward side and an inward side in the vehicle width direction, respectively.

As shown in FIGS. 2-5, the front side frame 11 comprises an upper wall portion 11a, a lower wall portion 11b which faces the upper wall portion 11a, an outward side wall portion 11c as a side wall portion which is positioned on the outward side, in the vehicle width direction, of the vehicle 1, and an inward side wall portion 11d as another side wall portion which is positioned on the inward side, in the vehicle width direction, of the vehicle 1 and faces the outward side wall portion 11c. The outward side wall portion 11c is formed by an outer member 21, and the lower wall portion 11b and the inward side wall portion 11d are formed by an inner member 22 which is configured to have a hat-shaped cross section.

The outer member 21 includes flange portions 21a, 21b at an upper side and a lower side of the outward side wall portion 11c (an upper end portion and a lower end portion of the outer member 21), and the inner member 22 includes flange portions 22a, 22b at an outward end portion, in the vehicle width direction, of the upper wall portion 11a and an outward end portion, in the vehicle width direction, of the lower wall portion 11b. These upper-side flange portions 21a, 22a and these lower-side flange portions 21b, 22b are respectively joined together by welding. The closed cross section is formed by the outer member 21 and the inner member 22 which are joined to each other as described above. Herein, the flange portions 21a, 21b of the outer member 21 are located substantially at the same position, in the vehicle width direction, as the outward side wall portion 11c.

Figure 2:
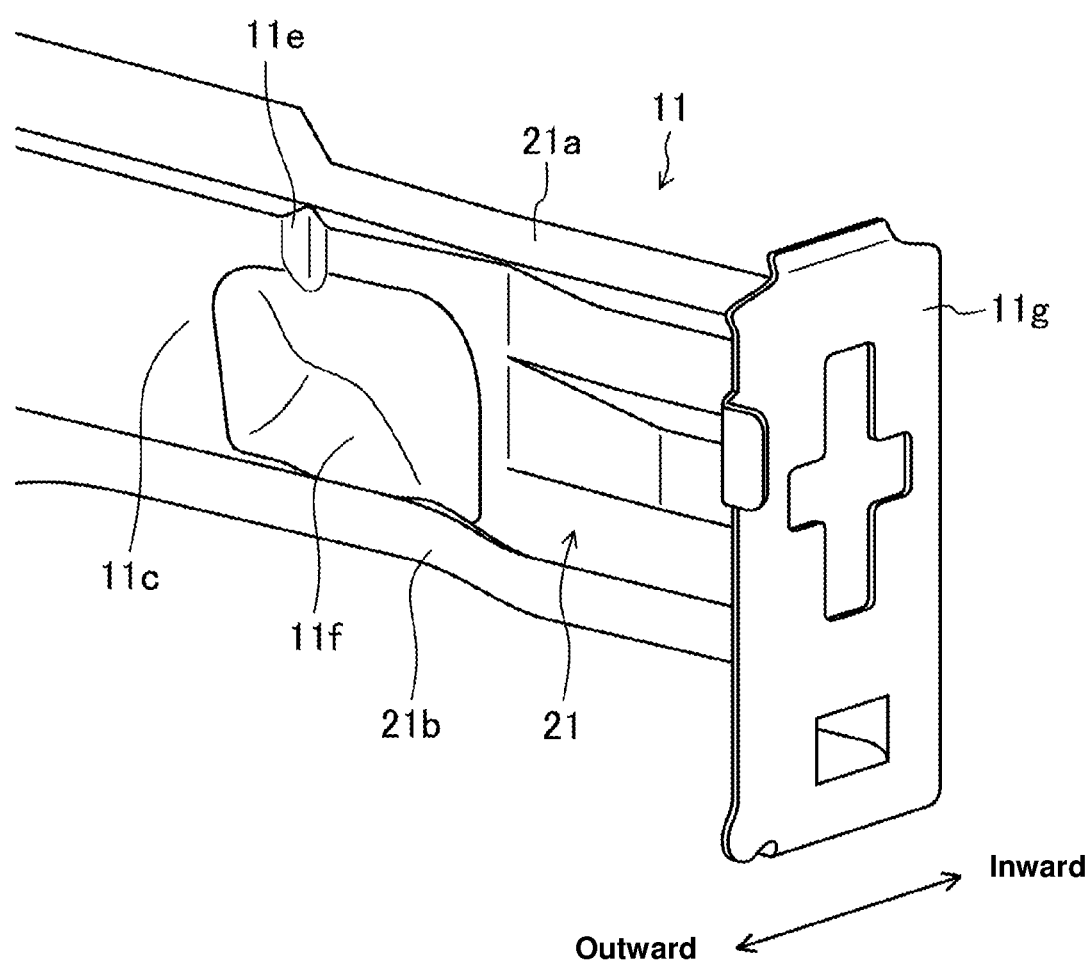
FIG. 2 is a perspective view of a right-side front side frame of the vehicle, when viewed from a vehicle forward-and-rightward (outward) side.
Figure 3:
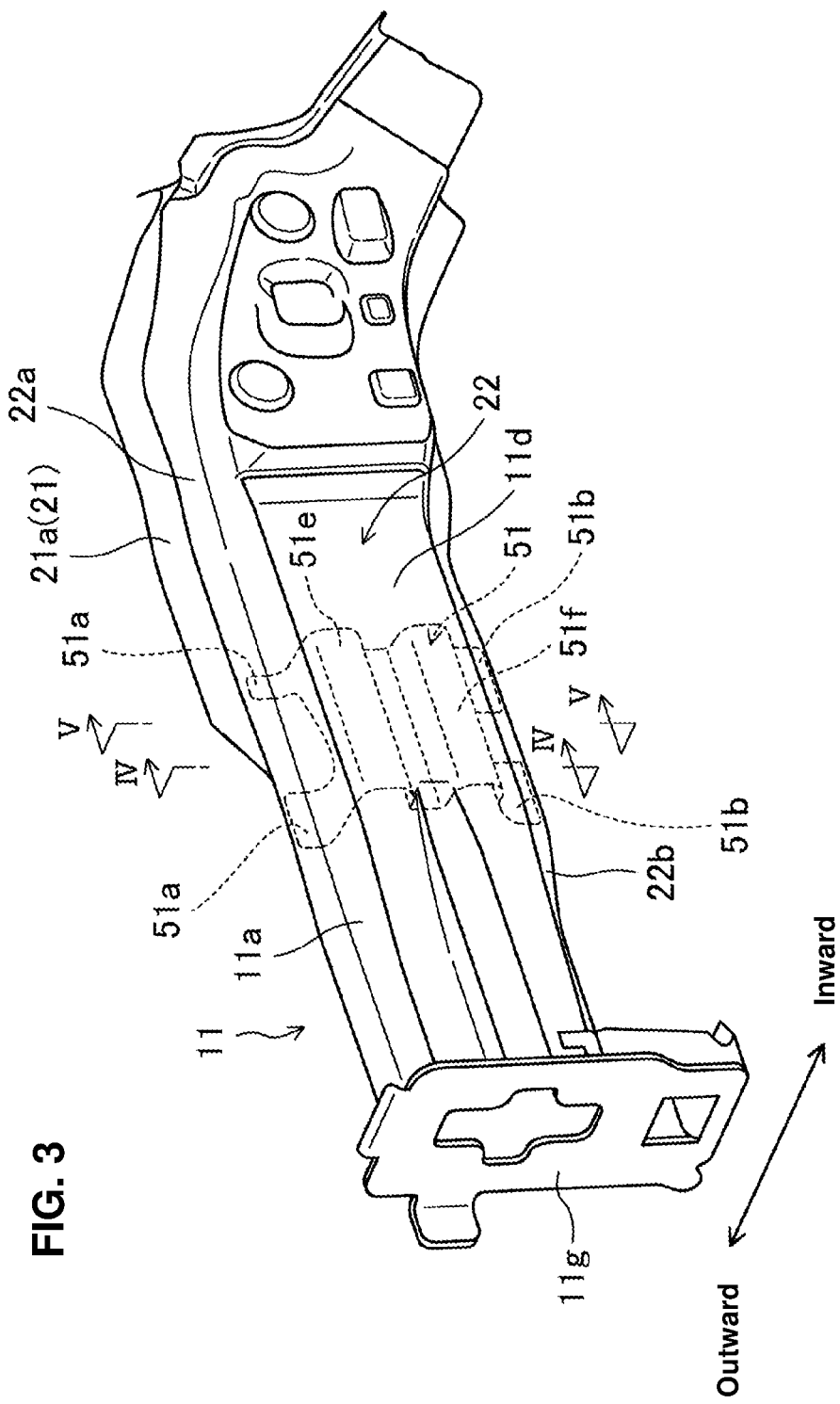
FIG. 3 is a perspective view of the right-side front side frame of the vehicle, when viewed from a vehicle forward-and-leftward (inward) side.

As shown in FIG. 2, a bead 11e which is configured to extend in a vertical direction and be concaved inward in the vehicle width direction is formed at a middle position, in the longitudinal direction, of the outward side wall portion 11c of the front side frame 11. In the present embodiment, since a recess portion 11f which is concaved inward in the vehicle width direction is formed at a portion of the outward side wall portion 11c which is positioned below the bead 11e, the bead 11e is formed above this recess portion 11f only. This bead 11e causes the front side frame 11 to be bent inward in the vehicle width direction at a longitudinal position where the bead 11e is provided in a frontal collision of the vehicle 1. Herein, in a case where the above-described recess portion 11f is not provided at the portion of the outward side wall portion 11c which is positioned below the bead 11e, the bead 11e may be provided to extend substantially over a whole part, in the vertical direction, of the outward side wall portion 11c.

It is preferable that the bead 11e be located at a position, in the longitudinal direction, of the front side frame 11 where the wheelhouse panel 17 and the suspension tower 18 are not connected (especially, where the suspension tower 18 is not connected). In the present embodiment, the bead 11e is located substantially at the same longitudinal position as a front end of the wheelhouse panel 17.

As shown in FIGS. 3-6, a reinforcing member 51 is provided inside the closed cross section of the front side frame 11 at a position, in the longitudinal direction, which corresponds to a forming position of the bead 11e such that the reinforcing member 51 extends between the outward side wall portion 11c and the inward side wall portion 11d.

Figure 4:
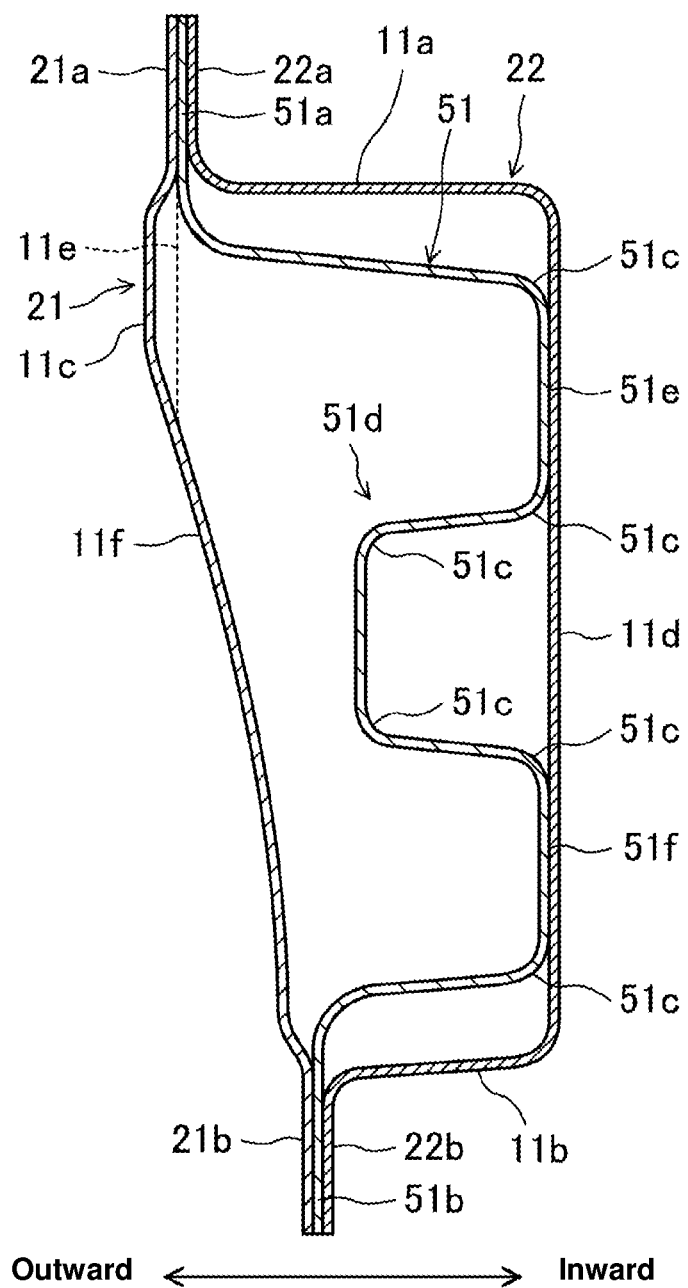
FIG. 4 is a sectional view taken along line IV-IV of FIG. 3.
Figure 5:
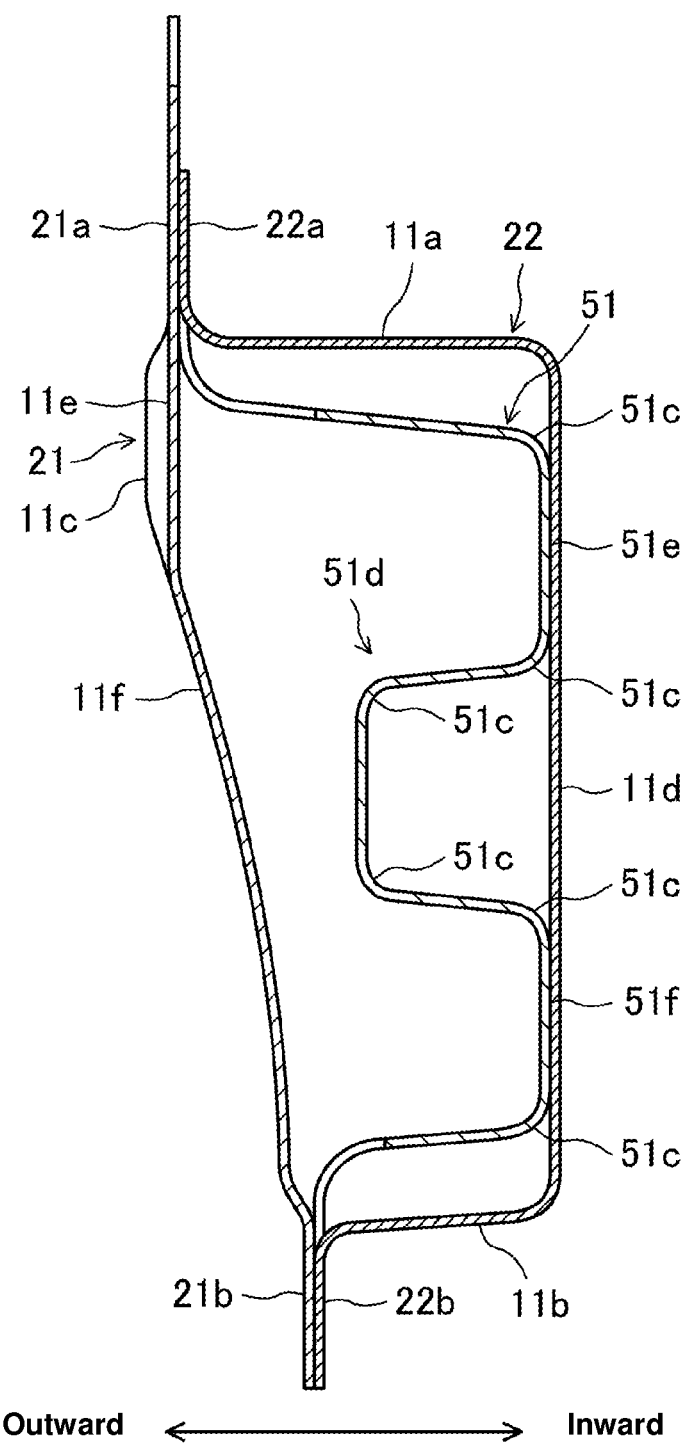
FIG. 5 is a sectional view taken along line V-V of FIG. 3.
Figure 6:
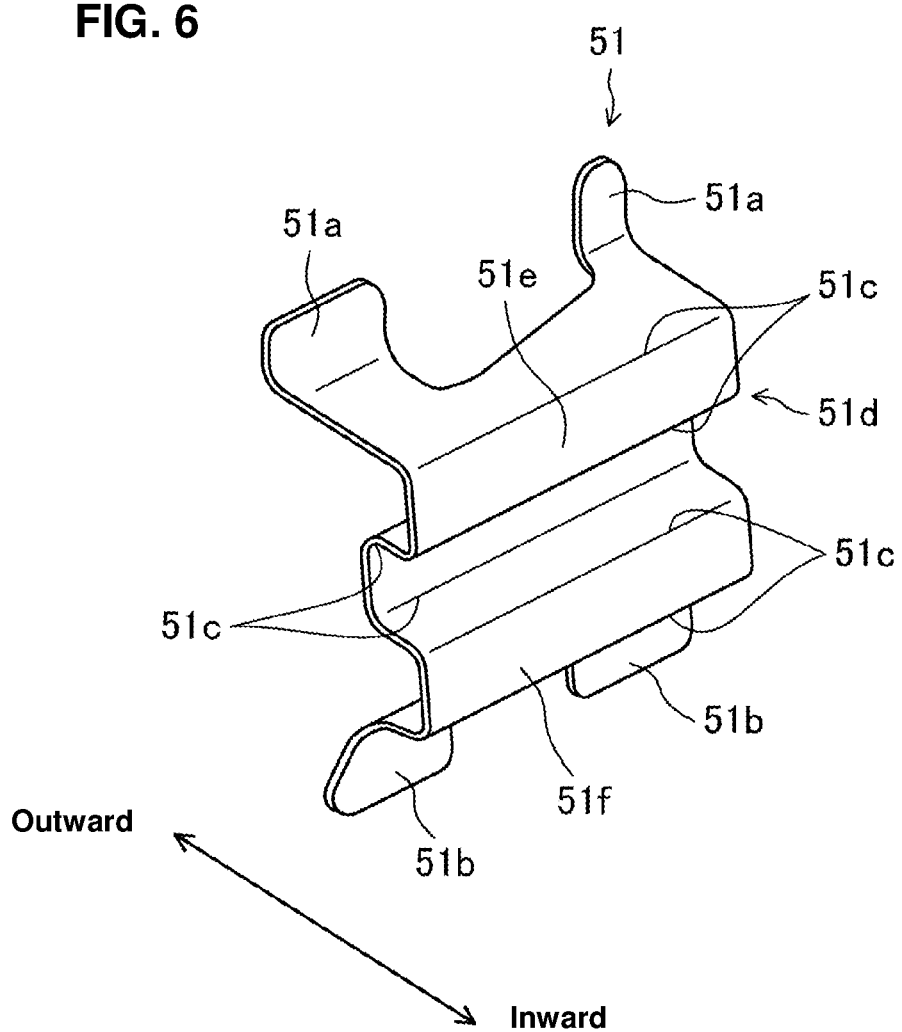
FIG. 6 is a perspective view of a reinforcing member which is arranged inside a closed cross section of the right-side front side frame of the vehicle, when viewed from the vehicle forward-and-leftward (inward) side.

The reinforcing member 51 is made of a plate member which extends in the vertical direction and in the longitudinal direction. The upper end portion 51a and the lower end portion 51b of the reinforcing member 51 are joined to the outward side wall portion 11c by welding. In the present embodiment, as shown in FIGS. 4 and 5, the upper end portion 51a of the reinforcing member 51 is interposed between the upper-side flange portions 21a, 22a of the outer member 21 and the inner member 22 and joined to the both flange portions 21a, 22a. Further, the lower end portion 51b of the reinforcing member 51 is interposed between the lower-side flange portions 21b, 22b of the outer member 21 and the inner member 22 and joined to the both flange portions 21b, 22b. Since the flange portions 21a, 21b of the outer member 21 (and the flange portions 22a, 22b of the inner member 22) are located substantially at the same position, in the vehicle width direction, of the outward side wall portion 11c as described above, it can be considered that the upper end portion 51a and the lower end portion 51b of the reinforcing member 51 are joined to the outward side wall portion 11c.

A middle portion, in the vertical direction, of the reinforcing member 51 is formed as a wavelike portion 51d which is configured to be bent in a rectangular-wavelike shape having plural bending lines (six bending lines in the present embodiment) which extend in the vehicle longitudinal direction. Bent parts are called bent portions 51c. An uppermost part and a lowermost part of the wavelike portion 51d respectively extend outward in the vehicle width direction and connect to the upper end portion 51a and the lower end portion 51b which are joined to the outward side wall portion 11c.

Protrusion tip faces (upper and lower protrusion tip faces) of parts of the wavelike portion 51d which protrude toward the inward side wall portion 11d are joined to the inward side wall portion 11d by welding. Hereafter, the upper-side protrusion tip face will be referred to as an upper-side joint face 51e, and the lower-side protrusion tip face will be referred to as a lower-side joint face 51f. The upper-side joint face 51e and the lower-side joint face 51f respectively include portions which face the bead 11e of the inward side wall portion 22d in the longitudinal direction and extend over a specified range in the longitudinal direction. It is preferable that this specified range be wider, in the longitudinal direction, than a range where a tensional load is generated at the inward side wall portion 11d when the outward side wall portion 11c of the front side frame 11 is bent inward locally at the position where the bead 11e is provided as described later.

A protrusion tip face (positioned between the upper-side joint face 51e and the lower-side joint face 51f in the vertical direction) of a part of the wavelike portion 51d which protrudes toward the outward side wall portion 11c is positioned, in the vehicle width direction, between the outward side wall portion 11c and the inward side wall portion 11d, not being joined to any of the outward side wall portion 11c and the inward side wall portion 11d.

The upper end portion 51a and the lower end portion 51b of the reinforcing member 51 joined to the outward side wall portion 11c respectively branch off in the vehicle longitudinal direction, interposing the bead 11e therebetween, and are joined to the outward side wall portion 11c. That is, the upper end portion 51a of the reinforcing member 51 and an outward portion of the uppermost part of the wavelike portion 51d are configured to have a cutout at a central portion, in the vehicle width direction, thereof, and the lower end portion 51b of the reinforcing member 51 and an outward portion of the lowermost part of the wavelike portion 51d are configured to have a cutout at a central portion, in the vehicle width direction, thereof. Thereby, a joint length, in the vehicle longitudinal direction, of the reinforcing member 51 and the inward side wall portion 11d is set to be longer than that of the reinforcing member 51 and the outward side wall portion 11c. Further, in the present embodiment, a joint area of the reinforcing member 51 and the inward side wall portion 11d is set to be larger than that of the reinforcing member 51 and the outward side wall portion 11c.

Before joining of the outer member 21 and the inner member 22, the upper-side joint face 51e and the lower-side joint face 51f of the wavelike portion 51d of the reinforcing member 51 are joined to the inner member 22 (the inward side wall portion 11d) at the longitudinal position corresponding to the bead 11e. Herein, it is preferable that the reinforcing member 51 be joined to the inner member 22 through its positioning. Then, when the outer member 21 and the inner member 22 are joined together, the upper end portion 51a of the reinforcing member 51 is joined to the both flange portions 21a, 22a in a state where this upper end portion 51a is interposed between the upper-side flange portions 21a, 22a, and the lower end portion 51b of the reinforcing member 51 is joined to the both flange portions 21b, 22b in a state where this lower end portion 51b is interposed between the lower-side flange portions 21b, 22b.

Figure 7:
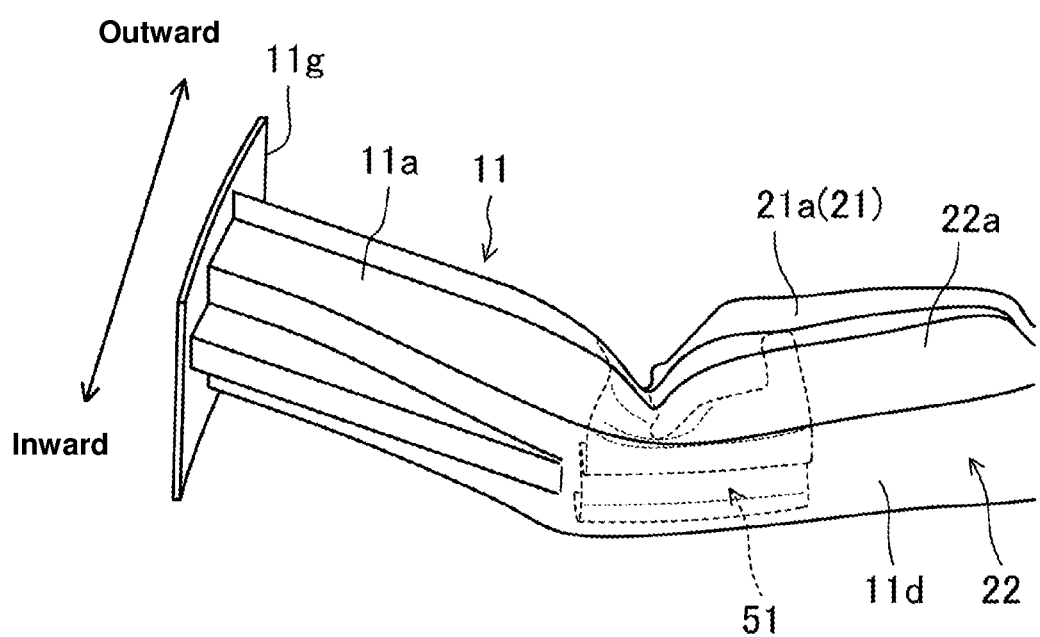
FIG. 7 is a perspective view showing a state where an outward side wall portion of the front side frame is bent inward locally at a position where a bead is provided when an impact load is inputted to the right-side front side frame from a vehicle forward side.

In a case where a collision load is inputted to the front side frame 11 by way of the bumper beam and the crash can 31 from the vehicle forward side in the frontal collision of the vehicle 1, as shown in FIG. 7, the outward side wall portion 11c of the front side frame 11 is bent inward locally at the position where the bead 11e is provided (buckling occurs locally at the position where the bead 11e is provided). Herein, since the joint length, in the longitudinal direction, of the outward side wall portion 11c and the reinforcing member 51 is short and also the upper end portion 51a and the lower end portion 51b of the reinforcing member 51 respectively branch off in the vehicle longitudinal direction, interposing the bead 11e therebetween, and are joined to the outward side wall portion 11c, the reinforcing member 51 does not block the local bending of the outward side wall portion 11c.

The bending of the outward side wall portion 11c causes a tensional load to be generated at a portion of the inward side wall portion 11d which faces the bead 11e and its longitudinally surrounding portion. Herein, the upper-side joint face 51e and the lower-side joint face 51f of the wavelike portion 51d of the reinforcing member 51 are joined to an area of the inward side wall portion 11d which is wider than the above-described longitudinal range where the tensional load is generated, and the reinforcing member 51 is configured not to be bent inward easily by the above-described bent portions 51c of the wavelike portion 51d of the reinforcing member 51. Accordingly, the above-described tensional load can be received at the wide range, in the longitudinal direction, of the inward side wall portion 11d, so that local bending which occurs at the outward side wall 11c can be suppressed at the inward side wall portion 11d. That is, while the inward side wall portion 11d may be easily bent inward after the outward wide wall 11c is bent inward locally if the reinforcing member 51 is not provided, the inward side wall 11d can be suppressed from being bent by providing the reinforcing member 51, so that the performance of the impact-energy absorption by means of the front side frame 11 can be improved in the frontal collision of the vehicle 1.

Figure 8:
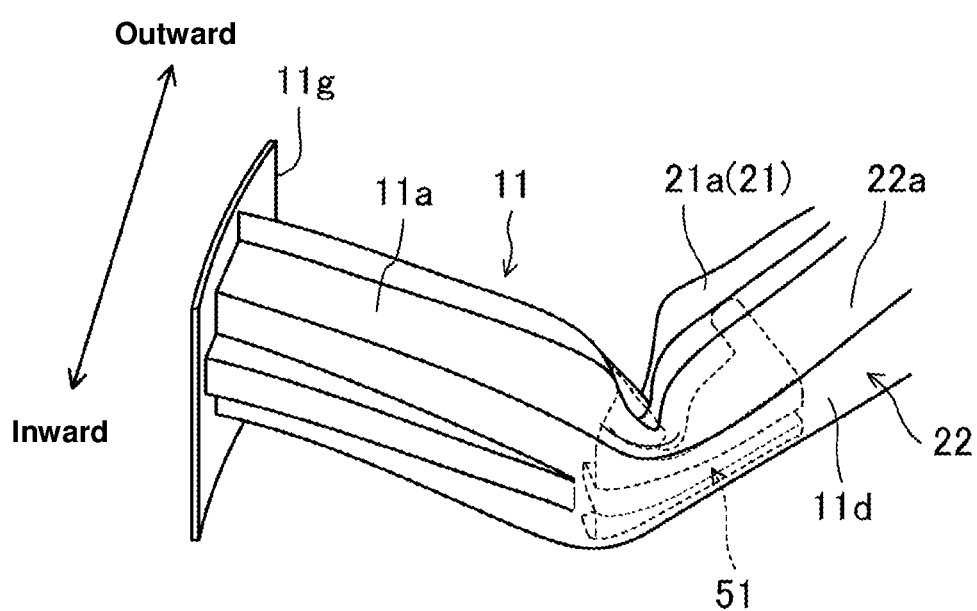
FIG. 8 is a perspective view showing a state where an inward side wall portion of the front side frame is bent inward, additionally to the outward side wall portion, which corresponds to FIG. 7.

Finally, the inward side wall portion 11d is also bent inward together with the wavelike portion 51d of the reinforcing member 51 as shown in FIG. 8.

Figure 9:
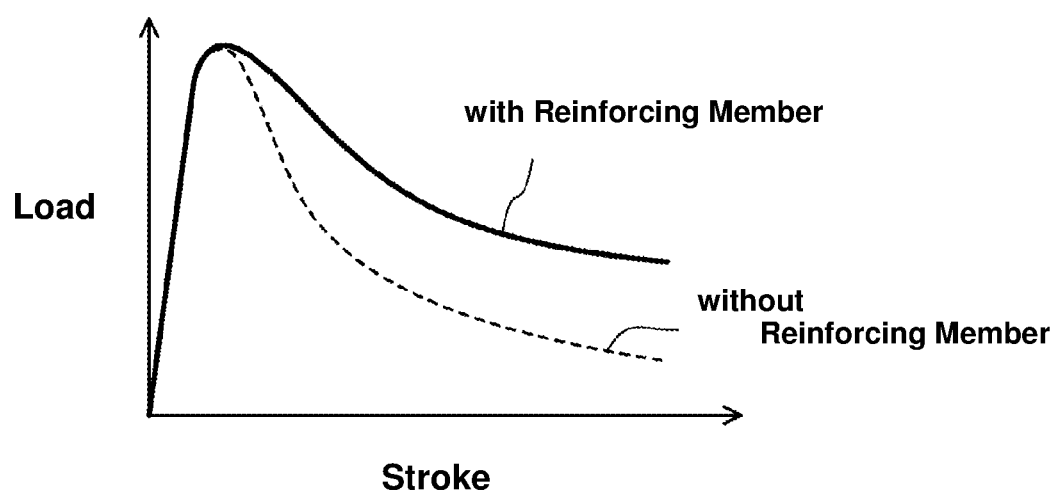
FIG. 9 is a graph showing a relationship between a retreat amount (stroke) of a front end of the right-side front side frame and a load inputted to the front end of the front side frame in a vehicle frontal collision.

Herein, a relationship between a retreat amount (stroke) of the front end of the front side frame 11 and the load inputted to the front end of the front side frame 11 in the frontal collision of the vehicle 1 is shown in FIG. 9.

A peak of two graphs which show a case where the reinforcing member 51 is provided and another case where the reinforcing member 51 is not provided shows a buckling load of the outward side wall portion 11c which has local buckling. In any case, the load decreases as the stroke increases after the buckling load is generated, but the decreasing rate of the load of the case where the reinforcing member 51 is provided is smaller (gentler) than that of the case where the reinforcing member 51 is not provided. Since an area of a lower part of each graph means the amount of impact energy absorption, the impact energy in the case where the reinforcing member 51 is provided is absorbed more compared to the case where the reinforcing member 51 is not provided.

According to the present embodiment, since the joint length, in the vehicle longitudinal direction, of the reinforcing member 51 and the outward side wall portion 11c is set to be relatively short, the number of welding points of the reinforcing member 51 welded to the outward side wall portion 11c of the front side frame 11 can be reduced, so that the deterioration of the productivity can be suppressed. Further, by setting the joint length, in the vehicle longitudinal direction, of the reinforcing member 51 and the outward side wall portion 11c to be relatively short, the outward side wall portion 11c of the front side frame 11 is easily bent inward locally at the position where the bead 11e is provided in the vehicle frontal collision (the outward side wall portion 11c has easily buckling locally at the position where the bead 11e is provided). Meanwhile, since the joint length, in the vehicle longitudinal direction, of the reinforcing member 51 and the inward side wall portion 11d where the tensional load is generated by this bending of the outward side wall portion 11c is set to be relatively long, this tensional load can be received at a wide range in the vehicle longitudinal direction, so that the inward side wall portion 11d is suppressed from being bent locally unlike the outward side wall portion 11c. Accordingly, the performance of the impact-energy absorption by means of the front side frame 11 in the frontal collision of the vehicle 1 can be improved.

The present invention should not be limited to the above-described embodiment and any other modifications or improvements may be applied within the scope of a spirit of the present invention.

For example, while the upper end portion 51a and the lower end portion 51b of the reinforcing member 51 respectively branch off in the longitudinal direction, interposing the bead 11e therebetween, in the above-described embodiment, these portions 51a, 51b may be configured not to branch off and to be joined to the outward side wall portion 11c substantially at the same longitudinal position as the bead 11e. That is, in the case where the joint length, in the vehicle longitudinal direction, of the upper end portion 51a and the lower end portion 51b of the reinforcing member 51 and the outward side wall portion 11c is relatively short, the outward side wall portion 11c is bent easily at the position where the bead 11e is provided. Herein, in order to configure the outward side wall portion 11c to be bent more easily (to reduce the buckling load), it is preferable that the upper end portion 51a and the lower end portion 51b of the reinforcing member 51 be configured like the above-described embodiment.

Further, while the middle portion, in the vertical direction, of the reinforcing member 51 is configured as the wavelike portion 51 in the above-described embodiment, any configuration is applicable as long as the joint length, in the longitudinal direction, of the reinforcing member 51 and the inward side wall portion 11d is set to be longer than that of the reinforcing member 51 and the outward side wall portion 11c so that the inward side wall portion 11d can be suppressed from being easily bent locally. For example, a portion of the reinforcing member 51 of the above-described embodiment which is positioned between the upper-side joint face 51e and the lower-side joint face 51f may be a bead which is configured to extend in the longitudinal direction and be concaved outward in the vehicle width direction. Alternatively, this kind of bead may be formed at the upper-side joint face 51e and/or the lower-side joint face 51f.

What is claimed is:

1. A vehicle-body structure, comprising:
a front side frame extending in a vehicle longitudinal direction at a front part of a vehicle and comprising an outward side wall portion and an inward side wall portion, the outward side wall portion being a side wall portion which is positioned on an outward side, in a vehicle width direction, of the vehicle and the inward side wall portion being another side wall portion which is positioned on an inward side, in the vehicle width direction, of the vehicle, the front side frame having a closed cross section;
a bead formed at a middle position, in the vehicle longitudinal direction, of the outward side wall portion of the front side frame, the bead being configured to cause the front side frame to be bent inward at the middle position of the outward side wall portion where the bead is provided in a vehicle frontal collision; and
a reinforcing member provided inside the closed cross section of the front side frame at a position, in the vehicle longitudinal direction, which corresponds to a forming position of the bead, the reinforcing member extending between the outward side wall portion and the inward side wall portion of the front side frame,
wherein said reinforcing member is joined to said outward side wall portion and said inward side wall portion of the front side frame, and a joint length, in the vehicle longitudinal direction, of the reinforcing member and the inward side wall portion is set to be longer than that of the reinforcing member and the outward side wall portion,
wherein said reinforcing member has a joint face which is jointed to said inward side wall portion, the joint face including a portion of said reinforcing member which faces the bead of said inward side wall portion in the vehicle longitudinal direction and extends over a specified range in the vehicle longitudinal direction of said reinforcing member, said reinforcing member and the bead being located on the same front side frame, and
wherein the front side frame further comprises an upper wall portion and a lower wall portion which faces the upper wall portion, the inward side wall portion faces the outward side wall portion, and said reinforcing member is joined to the inward side wall portion and the outward side wall portion.

2. The vehicle-body structure of claim 1, wherein said reinforcing member is made of a plate member which extends in a vertical direction and in the vehicle longitudinal direction, an upper end portion and a lower end portion of the reinforcing member are joined to said outward side wall portion of the front side frame, a middle portion, in the vertical direction, of the reinforcing member is formed as a wavelike portion which is configured to be bent in a rectangular-wavelike shape having plural bending lines extending in the vehicle longitudinal direction, and a protrusion tip face of a part of said wavelike portion which is configured to protrude toward the inward side wall portion of the front side frame is joined to the inward side wall portion.

3. A vehicle-body structure, comprising:
a front side frame extending in a vehicle longitudinal direction at a front part of a vehicle and comprising an outward side wall portion and an inward side wall portion, the outward side wall portion being positioned on an outward side, in a vehicle width direction, of the vehicle and the inward side wall portion being positioned on an inward side, in the vehicle width direction, of the vehicle, the front side frame having a closed cross section;
a bead formed at a middle position, in the vehicle longitudinal direction, of the outward side wall portion of the front side frame, the bead being configured to cause the front side frame to be bent inward at the middle position of the outward side wall portion where the bead is provided in a vehicle frontal collision; and
a reinforcing member provided inside the closed cross section of the front side frame at a position, in the vehicle longitudinal direction, which corresponds to a forming position of the bead, the reinforcing member extending between the outward side wall portion and the inward side wall portion of the front side frame,
wherein said reinforcing member is joined to said outward side wall portion and said inward side wall portion of the front side frame, and a joint length, in the vehicle longitudinal direction, of the reinforcing member and the inward side wall portion is set to be longer than that of the reinforcing member and the outward side wall portion,
wherein said reinforcing member is made of a plate member which extends in a vertical direction and in the vehicle longitudinal direction, an upper end portion and a lower end portion of the reinforcing member are joined to said outward side wall portion of the front side frame, a middle portion, in the vertical direction, of the reinforcing member is formed as a wavelike portion which is configured to be bent in a rectangular-wavelike shape having plural bending lines extending in the vehicle longitudinal direction, and a protrusion tip face of a part of said wavelike portion which is configured to protrude toward the inward side wall portion of the front side frame is joined to the inward side wall portion, and
wherein each of said upper end portion and said lower end portion of the reinforcing member joined to the outward side wall portion of the front side frame is configured to branch off in the vehicle longitudinal direction, interposing said bead therebetween, and be joined to the outward side wall portion.

* * * * *